Patented Aug. 18, 1953

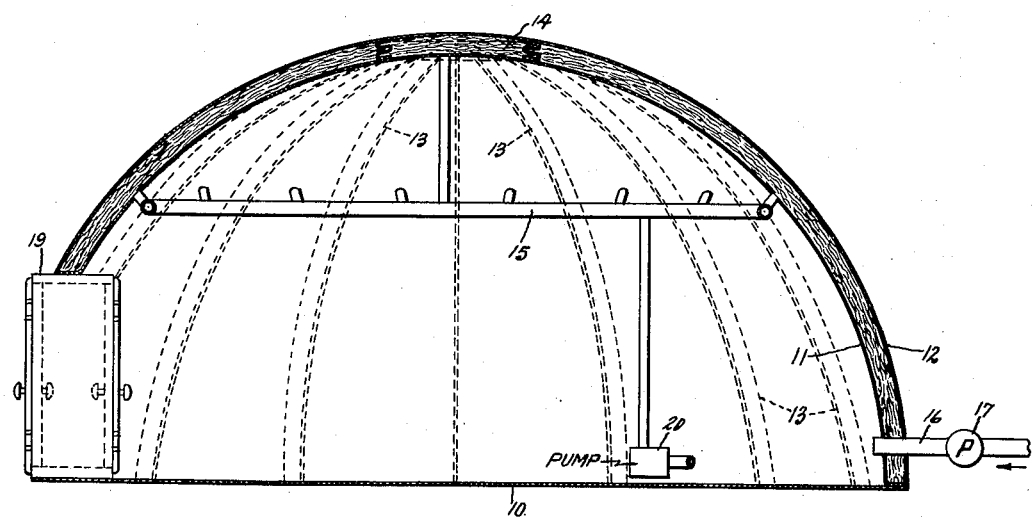

2,649,101

UNITED STATES PATENT OFFICE 2,649,101

DOUBLE-WALL PORTABLE SHELTER

Chauncey G. Suits, Schenectady, N. Y., assignor to General Electric Company, a corporation of New York Application April 9, 1952, Serial No. 281,409

8 Claims. (Cl. 135—1)

This invention relates to an easily portable double-wall structure having insulation which makes it suitable for use in arctic cold as well as equatorial heat. The shelter of this invention is particularly useful in temporary or semi-permanent military installations and offers excellent protection to the many types of electronic equipment used in military operations.

Some kinds of radar equipment, particularly land based perimeter search sets, require a hemispherical dome to protect the rotating antenna from the weather. These domes have recently been made of large rubberized cloth bags inflated at a pressure slightly above atmospheric. Access to the inflated housing is provided through a double door air lock arrangement. As long as the inside pressure is slightly above the outside, such bags have sufficient strength and rigidity for use under adverse weather conditions but it is necessary to maintain the pressure differential at all times. Since such bags are not insulated, their use in the tropics is accompanied by intolerable heat and in the arctic regions by extreme cold.

It is an object of this invention to provide a portable shelter of non-rigid, foldable material which may be made rigid after it is set up.

Another object of the invention is to provide a portable foldable shelter having walls insulated to resist heat transfer therethrough.

It is a further object of the invention to provide a portable insulated shelter which may be transported in folded form and quickly set up by inflating and then made rigid by evacuating the space between the two walls of the structure.

A still further object of the invention is to provide an insulated double-walled dome-shaped shelter for protecting electronic equipment.

Briefly stated, in accordance with one aspect of this invention I provide a shelter consisting of a double-wall structure of non-rigid, foldable, gas-tight material, a blanket of insulating material between the two walls of the structure, means for inflating the structure, and means for evacuating the space between the two walls whereby atmospheric pressure against the walls compresses the blanket of insulating material and thereby imparts rigidity to the structure.

The drawing illustrates in cross section a dome-shaped embodiment of my invention particularly adapted to protect a rotating radar antenna.

A base or floor 10 has a gas-tight connection to the inner wall 11 and outer wall 12 of a dome-shaped bag. The floor 10 may be made of any material which can be walked on without undue wear provided the material is reasonably air tight. Wood or metal may be employed for this purpose but heavy fabric or plastic is likewise satisfactory. The walls 11 and 12 must be impervious to the passage of air. Commercially available plastics such as polyethylene and polystyrene are satisfactory. However, it is preferable to have a fabric base in order to minimize tearing. Accordingly, rubberized fabrics or plastic-impregnated fabrics constitute preferred forms of my invention.

The space between the walls 11 and 12 is filled with a batt or blanket of insulating material such as kapok, rock wool, asbestos, or glass fibers. Non-fibrous insulating minerals such as vermiculite and cork may be used. Animal fibers such as sheep's wool are expensive but otherwise satisfactory. A preferred insulating material to fill the space between the walls 11 and 12 is a blanket of glass fibers the individual filaments of which have a diameter of less than 1 mil.

While the space defined by the walls 11 and 12 could be a single continuous open space, it is desirable to partition this space in order to provide compartmentation which will limit the effect of a leak or puncture of one of the walls. Thus, the partitions, which are shown in dotted lines at 13, divide the bag formed by the walls 11 and 12 into a number of hemispherical segments. These hemispherical segments may be arranged to come together at the top of the structure or they may connect with a crown piece or vent 14 as illustrated. Each segmented compartment is connected to a manifold 15 which is in turn connected to a vacuum pump 20 shown in block form. Any of the small vacuum pumps available in the market will operate satisfactorily in conjunction with the manifold 15.

An air intake pipe 16 extends through the walls 11 and 12 to the interior of the structure. A pump 17, shown in block form, forces air from the exterior through the pipe 16 to the interior of the structure during the initial inflation step. A double door air lock 19 shown at the left of the drawing enables entry to be made to the interior of the structure while it is being inflated without reversing the inflation process.

In setting up the structure illustrated, the pack comprising the structure is unfolded until the floor 10 is flat. The pump 17 is then energized to force air through the conduit 16 to the interior of the structure. As soon as the structure is inflated to the desired shape, the evacuating pump 20 is started and the segmental spaces between the walls 11 and 12 are evacuated. Atmospheric pressure upon the walls 11 and 12 then forces them against the insulation with a pressure that may exceed 14 pounds per sq. in. This operation compacts the insulation sufficiently to make it quite rigid. As soon as the structure has become rigid operation of the pump 17 may be discontinued and it may thereafter be used as a standby pump in the event the vacuum pump should fail or the wall 12 should be punctured in enough places to break the vacuum.

If the walls 11 and 12 are extremely gas tight, the vacuum pump may be shut off for extended intervals of time.

When the vacuum is broken the mineral insulation between the walls 11 and 12 expands considerably thereby making the structure very cumbersome when it is desired to fold it preparatory to removal to a different location. This can be obviated by making the manifold 15 of flexible material and breaking the vacuum only partially so that the segmental spaces are flexible but do not occupy their maximum volume. The fabric may then be folded and after it is folded vacuum may be reapplied to reduce its volume still further.

The insulation quality is determined by the thickness of the segmental spaces under vacuum. I have found that satisfactory insulation may be achieved by a blanket of glass fibers about 1" thick at a pressure of the order of 10 mm. A structure having this insulation thickness is satisfactory for general purpose use either in regions of extreme cold or extreme heat.

While the structure illustrated has a dome-like shape it is to be understood that box-like and other shapes are readily attainable provided the fabric composing the walls 11 and 12 is cut to the pattern appropriate to a different shape.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. A shelter comprising a double-wall structure of non-rigid, foldable, gas-tight material, a blanket of insulating material between the two walls of said structure, means for inflating said structure, and means for evacuating the space between the two walls whereby atmospheric pressure against said walls compresses the blanket of insulating material thereby imparting rigidity to said structure.

2. A shelter comprising a plurality of mating double-wall sections of non-rigid, pliable material, each of said section being gas-tight, a blanket of insulating material between the two walls of each of said sections, a manifold connected to the interior of each double-wall section, and means connected to said manifold for evacuating the space between the two walls of each of said sections whereby atmospheric pressure against said walls compresses the blanket of insulating material thereby imparting rigidity to said shelter.

3. A dome-shaped shelter comprising a plurality of mating double-wall semispherical segments of non-rigid, pliable material, each of said segments being gas-tight, a batt of insulating material between the two walls of each of said segments, a manifold having a connection to the interior of each double-wall segment, and means connected to said manifold for evacuating the space occupied by said insulating material whereby atmospheric pressure against said walls compresses the batt of insulating material thereby imparting rigidity to said shelter.

4. A dome-shaped shelter comprising a double-walled bag composed of non-rigid, foldable, gas tight material, a batt of mineral insulating material between the two walls of said bag, means for inflating said bag, and means for evacuating the space between the walls of said bag whereby atmospheric pressure against said walls compresses the batt of insulating material thereby imparting rigidity to said shelter.

5. A dome-shaped shelter comprising an inverted double-walled bag of hemispherical configuration said bag being composed of non-rigid, foldable, gas-tight material, a batt of mineral insulating material between the two walls of said bag, a gas-tight floor to which said bag is connected, a first pump for inflating said bag, and a second pump for evacuating the space between the walls occupied by said batt of insulating material whereby atmospheric pressure against said walls compresses the batt of insulating material thereby imparting rigidity to said shelter.

6. A dome-shaped shelter as claimed in claim 5 wherein said double-walled structure is divided into a plurality of sections each having gas-tight integrity and a vacuum connection.

7. A dome-shaped shelter as claimed in claim 5 wherein said bag has a double door air lock extending thereunto.

8. A dome-shaped shelter as claimed in claim 5 wherein the bag walls are composed of rubberized fabric.

CHAUNCEY G. SUITS.

References Cited in the file of this patent

UNITED STATES PATENTS

| Number | Name | Date |
|---|---|---|
| 1,302,182 | Lanchester | Apr. 29, 1919 |
| 2,363,917 | Waterman et al. | Nov. 28, 1944 |
| 2,411,316 | Capita | Nov. 19, 1946 |